Patented June 17, 1941

2,245,824

UNITED STATES PATENT OFFICE 2,245,824

METHOD OF MANUFACTURING GLASS ROPE

Rudolph George Roesch, Syracuse, N. Y., assignor to The Eraser Company, Inc., Syracuse, N. Y., a corporation of New York No Drawing. Application August 3, 1940,
Serial No. 351,172

6 Claims. (Cl. 96—3)

My invention is concerned with a method of manufacturing glass rope from fibres or filaments made of common glass, the composition of which includes silica, soda and lime.

Rope made from common glass fibres has many desirable characteristics in that it is inert to most chemicals and, therefore, may be used in many applications where metal rope or rope made from vegetable fibres would deteriorate rapidly.

Common glass fibres possess a certain amount of flexibility but are brittle and, in their natural state, cannot be woven or twisted successfully to form a skein or rope.

An object of my invention is to provide a method for treating the glass fibres so that said fibres may be manufactured into a twisted rope or woven belt without undue breakage of the individual fibres.

Another object of my invention is to case the fibres with an envelope of flexible material such as rubber which will act to strengthen without impairing the flexibility of the fibres.

Another object of my invention is to treat a bundle of fibres with a covering and binding compound and form the bundle into a substantially cylindrical strand that may be woven with similar strands to form a glass rope.

Other objects and advantages will appear from the following description.

I have discovered that by treating the fibres so as to coat them with a flexible covering material, the fibres may be bound together in bundles and the bundles twisted or woven into rope without undue difficulty from breaking of the individual fibres.

The coating material that I prefer to use is applied in the liquid form and is of a nature that wets the surface of the glass and has an affinity therefor so that the glass fibres become coated with an envelope of the treating material, at least to a large degree.

A covering and binding agent that I have found to be successful is an aqueous dispersion of prevulcanized rubber which is manufactured under United States Patents Nos. 1,443,149 and 1,682,857. This agent is a specialized compound designed for coating or impregnating and is sold under the trade name "Vultex." It is to be understood, however, that other rubber or flexible compounds may be used for strengthening the individual glass fibres and binding them together into suitable bundles or strands.

The manufacture of glass rope is accomplished in the following manner:

Glass fibres or filaments of suitable length are gathered into a loose bundle of approximately the diameter of the strand desired for weaving the rope. The bundle of glass filaments is then passed through a tank containing the strengthening and binding agent described above. In passing the glass filaments through the tank, it is preferable that they be spread out somewhat so that substantially all the fibres may be coated by the solution. After passing through the coating tank, the excess coating material is removed by passing the filaments through a suitable apparatus for squeezing out the excess coating material. For this purpose, I have found a pair of grooved rollers to be satisfactory. The bundle of filaments or strands is then raised vertically and given a vibratory or shaking movement which causes the bundle to assume a substantially cylindrical form. In this stage of the process, the coating material is still at least semi-liquid. The coating and binding liquid is next permitted to dry and set, after which the strand is ready for weaving into rope form. During the shaking step and the drying step, the bundle may conveniently be suspended vertically by means of a clamp, the gripping jaws of which should preferably have a cylindrical contour in order to facilitate the shaping of the bundle into a cylinder. A suitable number of strands made as described are then twisted or pleated in the manner well known in the art to form a rope. It is understood, of course, that the rope may comprise three, four or more strands.

The "Vultex" liquid coating compound referred to above is available on the market in a number of different formulas intended for specialized purposes. As will be readily understood by those skilled in the art, a formula should be selected which will give a thin coating of maximum flexibility. These Vultex compounds require no vulcanizing but set simply by air drying, and the rubber film produced after drying is not tacky and does not require dusting with talcum, mica or other dusting agent, as do the rubber films obtained by drying most rubber solutions if a tacky feel is to be avoided.

In the foregoing description, I have contemplated using glass fibres substantially as long as the desired length of the finished rope. It is possible, however, to make the rope of any length regardless of the length of the glass fibres by first manufacturing small bundles or threads comprised of a comparatively small number of filaments in accordance with the process described above, and then twisting these threads to form longer strands, and again passing the longer strands through the process described above to form the final strands for twisting into rope.

It is likewise possible to manufacture substantially flat pleated belts from the strands of pleated glass fibre described above. The process is the same up to the step where the strands are ready for twisting into rope when they may be pleated to form a flat belt by the usual method of pleating the strands together. As used in the appended claims, the term "rope" is intended to include such a belt.

I claim:

1. A method of making glass rope from glass filaments or fibres including gathering a suitable number of filaments in a bundle, treating the individual filaments in the bundle with a covering and binding agent which binding agent in the liquid form is characterized by its ability to wet the surface of the glass filaments, forming the treated filaments into a substantially cylindrical bundle, drying the treating agent to form a unitary strand of said bundle and pleating a plurality of said bundles to form a multi-strand glass rope.

2. A method of manufacturing a glass rope from glass filaments or fibres comprising gathering said filaments into a bundle, passing said filaments through an aqueous dispersion of prevulcanized rubber so as to treat the surfaces of the individual filaments with said aqueous dispersion, removing the excess of said treating material, forming said bundle into substantially cylindrical strand, drying said treating agent so as to form individual envelopes over at least a large proportion of said individual filaments, and pleating a plurality of said bundles to form a multi-strand rope.

3. A method of forming a flexible multi-strand glass rope from glass fibres or filaments comprising gathering a plurality of said filaments to form a bundle, immersing said bundle in a treating agent having the characteristic of wetting the surface of said glass fibres when said treating agent is in the liquid form, said treating agent having a characteristic of flexibility when in the solid form, removing said bundle from said treating agent, removing the excess of treating agent from said bundle, forming said bundle into a substantially cylindrical strand, drying said treating agent so as to coat and bind said filaments together, and pleating said strands together.

4. A method of manufacturing glass rope from glass filaments or fibres comprising gathering a plurality of said fibres into a bundle, treating said bundle with a binding and covering agent, removing the excess of said treating agent, forming said bundle into a substantially cylindrical thread, setting said treating agent, pleating a plurality of said threads to form a strand of desired length, and pleating a plurality of said strands to form a multi-strand rope.

5. The method of making glass rope which comprises passing a relatively long bundle of glass filaments or fibres through a liquid bath of an agent capable of binding said fibres together when dry, causing said bundle to assume a substantially cylindrical form while still wet by suspending it from one end and subjecting said end to a vibratory motion, said binding agent being such as to be flexible when dry, and pleating a plurality of said bundles together.

6. The method of making glass rope which comprises passing a relatively long bundle of glass filaments or fibres through a liquid bath of an agent capable of binding said fibres together when dry, removing excess liquid binding agent from said bundle, causing said bundle to assume a substantially cylindrical form while still wet by suspending it from one end and subjecting said end to a vibratory motion, said binding agent being such as to be flexible when dry, and pleating a plurality of said bundles together.

RUDOLPH GEORGE ROESCH.